United States Patent [19]

Southey

[11] 4,186,924
[45] Feb. 5, 1980

[54] ARTHRITIC GOLF CLUB GRIP

[75] Inventor: Robert G. Southey, Akron, Ohio

[73] Assignee: Eaton Corporation, Cleveland, Ohio

[21] Appl. No.: 889,781

[22] Filed: Mar. 24, 1978

[51] Int. Cl.$^2$ ............................................. A63B 53/14
[52] U.S. Cl. ................................ 273/81.4; 273/81 B; 249/142
[58] Field of Search .................. 273/67 DA, 73 J, 75, 273/81 R, 81 B, 81.4–81.6, 165; 128/77; 401/6, 8, 48; 145/61 R, 61 C; 16/110 R, 114 R; 74/558.5, 551.9

[56] References Cited

U.S. PATENT DOCUMENTS

| | | | |
|---|---|---|---|
| 1,677,099 | 7/1928 | Harness | 273/81 B |
| 1,768,933 | 7/1930 | Riley | 273/81 R X |
| 4,035,865 | 7/1977 | McRae et al. | 128/77 X |
| 4,067,573 | 1/1978 | Key | 273/81 B X |

FOREIGN PATENT DOCUMENTS

| | | | |
|---|---|---|---|
| 6763 | 4/1933 | Australia | 273/81 B |
| 146509 | 5/1952 | Australia | 273/81 B |
| 1792 | of 1911 | United Kingdom | 273/81 B |
| 474058 | 10/1937 | United Kingdom | 273/81 B |

*Primary Examiner*—Richard J. Apley
*Attorney, Agent, or Firm*—R. J. McCloskey; M. L. Union

[57] ABSTRACT

A molding apparatus for manufacturing a molded golf club grip includes a mold member having a generally cylindrical shaped cavity disposed therein and defined by an internal annular surface. The cavity has a longitudinal axis and a circular cross sectional configuration. An elongate core bar is disposable within the cavity with the longitudinal axis of the cavity and the core bar being coextensive. The core bar has an external surface which is spaced apart from the internal annular surface of the mold member when the core bar is disposed in the cavity and the annular surface of the mold member cooperates with the external surface of the core bar to define a molding cavity for receiving a moldable material therein for molding a golf club grip. The external surface of the core bar includes first and second substantially planer portions disposed substantially parallel to each other, a third planer portion disposed substantially perpendicular to the first and second portions and an arcuate portion interposed between the first and second portions. The configuration of the annular surface of the mold member and the external surface of the core bar enables the molding apparatus to manufacture a golf club grip having an elongate cavity disposed coaxial to the longitudinal axis of the body of the grip wherein the elongate cavity is defined by first and second planer internal surfaces disposed substantially parallel to each other, a third planer internal surface disposed substantially perpendicular to the first and second planer surfaces and an arcuate internal surface disposed between the first and second internal surfaces. The grip when disposed on the cylindrical shaft of a golf club includes first, second and third elongate projections disposed substantially parallel to the longitudinal axis of the grip. The first, second and third elongate projections extend in a radial direction from the longitudinal axis of the grip and add to the width of the grip to facilitate the proper lay of the grip and the golf club in the hand of a person using the grip. These projections are beneficial to enable the grip to be securely gripped by a person who cannot make a tight fist such as one having arthritis.

6 Claims, 5 Drawing Figures

U.S. Patent     Feb. 5, 1980     4,186,924
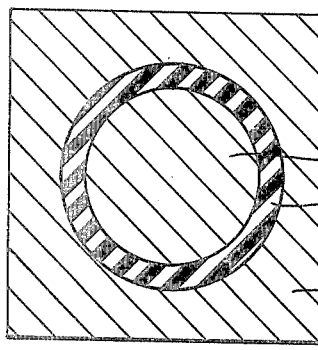
PRIOR ART
FIG. 1
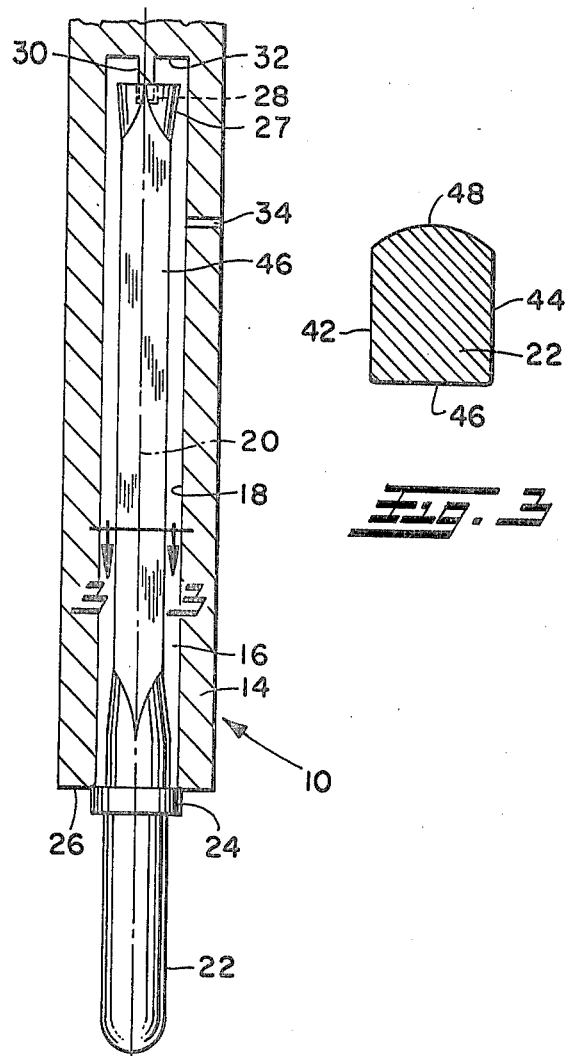
FIG. 2
FIG. 3
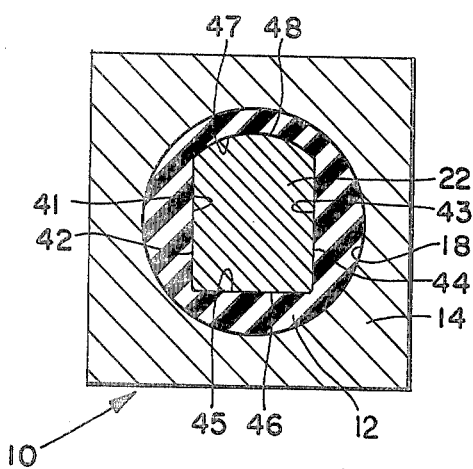
FIG. 4
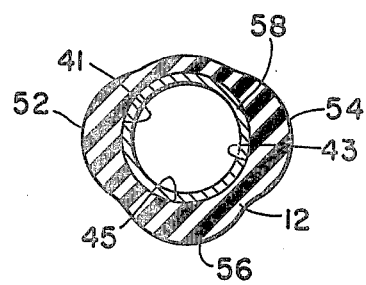
FIG. 5

ARTHRITIC GOLF CLUB GRIP

PRIOR ART STATEMENT

A patentability search has not been conducted on the present invention and the applicant knows of no references which are relevant to the present invention.

FIELD OF INVENTION

The present invention relates to an arthritic golf club grip having a plurity of projections thereon which add to the width of the golf grip to enable the grip to be securely gripped by a person who cannot make a tight fist. The projections facilitate the proper positioning of the grip and the club in the hand of a user. The present invention also relates to an apparatus for manufacturing the above described grip.

BACKGROUND OF THE INVENTION

Golf grips for use with golf clubs and apparatus for manufacturing such golf grips are known in the art. In the majority of the prior art grips, the external surface of the grip, when mounted on the shaft of a golf club, has a generally cylindrical configuration. When the golf grip has a generally cylindrical configuration, no means are provided for properly positioning the grip and the club in the hand of the user.

The majority of the golf grips manufactured today are manufactured in a cylindrical shaped mold in which a core bar is inserted. The moldable material, such as rubber, is injected into the space between the cylindrical mold and the core bar. This produces a grip which has a generally standard cross sectional diameter. If in the known apparatus, it is desired to increase the diameter of the grip, it is necessary to increase the diameter of the cylindrical mold cavity. This requires retooling for the grip or reworking of an old mold. Such a process is expensive and limits the specific types of grips for which the mold may be subsequently utilized.

SUMMARY OF THE INVENTION

The present invention provides a new and improved apparatus for manufacturing a molded gold club grip including a mold member, a generally cylindrical shaped cavity disposed in the mold member and defined by an internal annular surface of the mold member. The cavity has a longitudinal axis and a circular cross sectional configuration taken approximately perpendicular to the longitudinal axis. An elongate core bar having a longitudinal axis is disposable within the cavity with the longitudinal axis of the cavity and the core bar being coextensive. The core bar has an external surface which is spaced apart from the internal annular surface of the mold member when the core bar is disposed in the cavity. The annular surface of the mold member cooperates with the external surface of the core bar to define a molding cavity for receiving moldable material therein for molding a golf club grip. The external surface of the core bar includes first and second substantially planer portions disposed thereon substantially parallel to each other, a third planer portion disposed thereon substantially perpendicular to the first and second portions and an arcuate portion interposed between the first and second portions.

The present invention further provides a new and improved golf club grip adapted to be mounted on the shaft of a golf club including an elongate body having a longitudinal axis formed from a moldable resilient material. The body has an external surface having a substantially circular cross sectional configuration taken approximately perpendicular to the longitudinal axis of the body when the grip is not mounted on a shaft of a golf club. An elongate cavity is disposed in the body and adapted to receive the shaft of a golf club therein. The elongate cavity is defined by first and second planer internal surfaces disposed substantially parallel to each other, a third planer internal surface disposed substantially perpendicular to the first and second planer internal surfaces and an arcuate internal surface disposed between said first and second internal surfaces.

The present invention further provides a new and improved golf club grip as set forth in the preceeding paragraph wherein the external surface of the body includes first, second and third elongate projections disposed substantially parallel to the longitudinal axis of the body when the grip is mounted on the shaft of a golf club. The first, second and third elongate projections are disposed, respectively, adjacent the first, second the third planer internal surfaces.

DESCRIPTION OF THE DRAWINGS

FIG. 1 is a cross sectional view taken approximately perpendicular to the longitudinal axis of a prior art mold and core bar.

FIG. 2 is a plan view of a core bar of the present invention disposed in the mold member.

FIG. 3 is a cross sectional view of the core bar of the present invention taken approximately along lines 3-3 of FIG. 2.

FIG. 4 is a cross sectional view taken approximately perpendicular to the longitudinal axis of the core bar of a mold with the core bar inserted therein.

FIG. 5 is a cross sectional view, taken approximately perpendicular to the longitudinal axis of the grip, of a grip mounted on a cylindrical gold club shaft.

DESCRIPTION OF THE PREFERRED EMBODIMENT

Referring to the drawings, a molding apparatus 10 is provided for molding a golf club grip 12. As is more particularly illustrated in FIG. 2, the mold apparatus 10 includes a mold member 14 having a cavity 16 disposed therein. The cavity 16 is generally cylindrical in shape and is defined in part by an annular wall 18 disposed on an internal surface of the mold member 14. The cylindrical cavity 16 includes a longitudinal axis 20 and a circular cross sectional configuration taken perpendicular to the longitudinal axis 20 as is illustrated in FIG. 4.

A core bar 22 is disposable within the cylindrical cavity 16 with the longitudinal axis of the core bar 22 being coextensive with the longitudinal axis 20 of the cavity 16. The core bar 22 includes a flange 24 disposed thereon which forms a shutoff for prohibiting the flow of moldable material from the cavity 16 passed the flange 24. To this end, the flange 24 engages the surface 26 of the mold member 14 to seal the end of the cavity 16 adjacent the flange 24. A passage way 34 is provided in a wall of the mold member 14 to enable a source of moldable material (not illustrated) to communicate with the cavity 16.

An opening 28 is provided in the end 27 of the core bar 22. the opening 28 is disposed coaxially with the longitudinal axis of the core bar 22 and is adapted to receive a pin 30 which extends from a top surface 32 of the mold member 14 to register the core bar 22 in the cavity 16. When the care bar 22 is registered in the mold member 14, the space in the cavity 16 between the core bar 22 and the internal surface 18 of the mold member 14 forms an annular shaped cavity for receiving a moldable material therein for forming a golf club grip therein.

When the core bar 22 is registered in the cavity 16, a moldable material will be injectd through the passage 34 to substantially fill the cavity 16 to form a golf club grip therein. Preferably, the internal surface 18 of the mold member 14 includes designs disposed thereon which can be molded into the external surface of the golf grip molded in the cavity 16. After the moldable material is injected into the cavity 16, it is allowed to cure for a period of time. After curing, the mold member 14 is separated in a well known manner and the core bar 22 having the grip 12 molded thereon is removed from the mold 14. The grip 12 is then removed from the core bar. It should be appreciated that the end 27 of the core bar 22 has a slightly larger diameter than the central portion of the core bar 22 which necessitates the forceful removal of the molded grip from the core bar 22 over the enlarged end portion 27. To this end, air may be injected between the formed grip 12 and the core bar 27 to facilitate the removal of the grip 12 from the core bar 22. Since the grip 12 is formed from a resilient material, it can be deformed to allow removal of the grip 12 from the core bar 22 over the enlarged end portion 27.

In some instances, it is desirable to manufacture the cap of the golf club grip from a different material than the body. In these instances, a plug of deformable material can be inserted around the register pin 30 and the core bar 22 then registered in the cavity 16. Subsequently, a moldable material is injected into the cavity 16 via the passageway 34 and the plug of material located at the top of the cavity adjacent the pin 30 is compressed and heated to effectively mold that material into the cap of the golf club grip adjacent the end 27 of the core bar 22. The moldable material injected into the cavity 16 via the passageway 34 then coacts with the material forming the cap and the materials are bonded together by the pressure and heat of the molding process to form a one piece golf grip as is well known in the art. This enables the cap material to be different from the body material while still providing a one piece moldable grip.

Generally, golf club grips have a circular cross sectional internal and external configuration when taken substantially perpendicular to the longitudinal axis of the grip. Such a grip is molded by a mold 36 and core bar 38 as shown in FIG. 1. In this instance, the mold includes an annular internal surface and the core bar 38 has a substantially cylindrical configuration. Thus, the grip formed by the moldable mateiral 40, molded between the mold 36 and the core bar 38 has a generally cylindrical internal and external configuration. Such grips as manufactured by the apparatus illustrated in FIG. 1 are well known in the art. However, because such grips have a circular configuration, there is no tendency for the grip to fit in the hand of a user in a particular orientation. Also, such grips manufactured by the prior art apparatus generally have a standard cross sectional diameter which is not large enough for people who cannot make a tight fist to grip the handle of the golf club.

In the mold apparatus as utilized in the present invention, the core bar 22 includes a first planer surface 42, a second planer surface 44, disposed substantially parallel to surface 42 and a third planer surface 46, disposed substantially perpendicular to and interposed between the planer surfaces 42 and 44. The core bar 22 further includes an arcuate surface 48 which is interposed between the surfaces 42 and 44. The planer surfaces 42, 44 and 46 are preferably formed by grinding flats on the generally cylindrically shaped exterior surface of a core bar 22. This enables a standard core bar to be utilized to manufacture an arthritic grip with only a simple modification. The planer surfaces 42, 44 and 46 extend substantially parallel to the longitudinal axis of the core bar 22 and extend substantially along the entire length of the core bar which is received in the mold 14 except for the end portion thereof. Flats are not provided at the end 27 of the core bar 22 where the cap is molded and at the very bottom portion of the core bar 22 near the shutoff flange 24.

When a golf grip is molded between the mold 14 and the core bar 22, planer surfaces 41, 43 and 45 will be formed adjacent the planer surfaces 42, 44 and 46, respectively. The planer surfaces 41, 43 and 45 will be disposed within the internal cavity of the golf grip 12 and will be disposed parallel to the longitudinal axis of the grip. The planer surfaces 41 and 43 will be disposed parallel to each other and the planer surface 46 will be disposed substantially perpendicular to the surfaces 41 and 43. An elongate arcuate surface 47 will be formed within the internal cavity of the grip 12 adjacent the arcuate surface 48 of the core bar 22. The arcuate surface 47 will be interposed between planer surfaces 41 and 43.

The configuration of the core bar 22 enlarges the space between the internal surface 18 of the mold member 14 and the external surface of the core bar 22 at the portions where the planer surfaces 42, 44 and 46 are disposed on the exterior surface of the core bar 22. As is illustrated in FIG. 4, this enables the walls of the grip 12 to be substantially thicker adjacent the planer surfaces 41, 43 and 45. This is easily seen by a comparison of the core bar and mold of the present invention as illustrated in FIG. 4 with that of the prior art which is illustrated in FIG. 1. It can be seen that the amount of moldable material adjacent the planer surfaces 41, 43 and 45 is much thicker than the moldable material adjacent the arcuate surface 47 of the grip 12. This extra material is built up on the inside of grip 12 while maintaining the same circular outside configuration when the grip 12 is unmounted.

When the grip 12 is mounted on a standard round shaft 58 of a golf club, as is illustrated in FIG. 5, the extra material disposed adjacent the planer surfaces 41, 43 and 45 forms elongate projections which extend in a radial direction along the longitudinal length of the grip 12. Projections 52, 54 and 56 are formed on the exterior surface of the grip 12 adjacent the interior planer surfaces 41, 43 and 45, respectively. It should be appreciated that the planer surfaces 41, 43 and 45 of the grip 12 essentially conform to the cylindrical exterior surface of the shaft 58 upon which the grip 12 is mounted due to the resiliency of the material from which the grip 12 is formed.

The projections 52, 54 and 56 add to the width of the grip 12 when the grip is positioned on a cylindrical shaft 58. The increased diameter of the grip 12 facilitates the gripping of the grip by a person who cannot make a tight fist such as a person having an arthritic condition. In addition, the projections 52, 54 and 56 facilitate the proper lay of the grip 12 and the club shaft 58 in the hand of a user to thereby provide for the proper orientation of the club head (not illustrated). Preferably, the projection 56 extends toward the rear of the golf club shaft 58 and the projections 52 and 54 extend toward the side. The projection 56 has a tendency to lie in the palm of the user's hand and cooperates with the projections 52 and 54 to insure that the club lays properly in the hand of a user even if the user cannot make a tight fist to grip the grip 12.

From the foregoing, it should be apparent that a new and improved golf club grip has been provided which is adapted to mount on the shaft of a golf club and which includes an elongate body having a longitudinal axis and a substantially circular external cross sectional configuration when the grip is not mounted on a shaft of a golf club. The elongate cavity is defined by first and second planer internal surfaces disposed substantially parallel to each other and a third planer internal surface disposed perpendicular to the first and second planer internal surfaces. An arcuate internal surface is disposed between the first and second internal surfaces. When the grip is mounted on the cylindrical shaft of a golf club, first, second and third elongate projections are disposed on the external surface of the grip adjacent the first, second and third planer internal surfaces, respectively, of the grip to faciliate proper positioning and gripping of the grip by a user. Additionally, a molding apparatus has been disclosed for manufacturing a molded golf grip as set forth hereinabove. The molding apparatus includes an elongate core bar having first, second and third planer portions which cooperate to form the first, second and third internal planer surfaces on the grip.

What I claim is:

1. A golf club grip adapted to be mounted on a shaft of a golf club comprising, an elongate body formed from a moldable resilient material, said body having a longitudinal axis and an external surface having a substantially circular external cross sectional configuration taken approximately perpendicular to said longitudinal axis when said grip is not mounted on a shaft of a golf club, an elongate cavity disposed coaxial to the longitudinal axis of said body and adapted to receive a shaft, having a substantially cylindrically shaped external surface, of a golf club therein, said elongate cavity being defined by first and second planar internal surfaces disposed substantially parallel to each other, a third planar internal surface disposed substantially perpendicular to said first and second planar internal surfaces and an arcuate internal surface disposed between said first and second internal surfaces when said grip is not mounted on a shaft of a golf club.

2. A golf club grip adapted to be mounted on a shaft of a golf club as defined in claim 1 wherein said third planer internal surface is interposed between said first and second planer internal surfaces and said arcuate internal surface is disposed opposite from said third planer internal surface and contiguous to said first and second internal surfaces.

3. A golf club grip adapted to be mounted on a shaft of a golf club as defined in claim 1 wherein said body includes first, second, third and fourth elongate wall portions, respectively, disposed between the external surface of said body and said first, second and third planer internal surfaces and said arcuate internal surface, said first, second and third elongate wall portions being thicker, in a direction substantially perpendicular to said longitudinal axis of said body, then said fourth elongate wall portion.

4. A golf club grip mounted on a shaft of a golf club comprising, an elongate body formed from a moldable, resilient material, said body having a longitudinal axis and an external surface, an elongate cavity disposed coaxial to the longitudinal axis of said body and receiving a shaft, having a substantially cylindrically shaped external surface, of a golf club therein, said elongate cavity being defined by first and second planar internal surfaces disposed substantially parallel to each other, a third planar internal surface disposed substantially perpendicular to said first and second planar internal surfaces and an arcuate internal surface disposed between said first and second internal surfaces, said first, second, and third planar internal surfaces conforming to the cylindrically shaped external surface of a golf club shaft received therein to expand said external surface of said body outwarly in a direction perpendicular to the longitudinal axis of said body to form first, second and third elongate projections respectively disposed substantially parallel to the longitudinal axis of said body.

5. A gold club grip mounted on a shaft of a golf club as defined in claim 4 wherein said body further includes first, second, third and fourth elongate wall portions disposed between said external surface of said body and said first, second, and third planar internal surfaces and said arcuate internal surface, respectively, said first, second and third elongate wall portions being thicker, in a direction substantially perpendicular to said longitudinal axis of said body, than said fourth elongate wall portion.

6. a golf club grip mounted on a shaft of a golf club, as defined in claim 5, wherein said first, second and third elongate projections are disposed respectively on said first, second and third elongate wall portions.

* * * * *